(12) United States Patent
Park

(10) Patent No.: US 7,257,484 B2
(45) Date of Patent: Aug. 14, 2007

(54) METHOD FOR SEARCHING CAR NAVIGATION PATH BY USING LOG FILE

(75) Inventor: Seung-Bin Park, Seoul (KR)

(73) Assignee: Hyundai Autonet Co., Ltd., Icheon-si (KR)

( * ) Notice: Subject to any disclaimer, the term of this patent is extended or adjusted under 35 U.S.C. 154(b) by 413 days.

(21) Appl. No.: 10/725,491

(22) Filed: Dec. 3, 2003

(65) Prior Publication Data
US 2005/0085997 A1    Apr. 21, 2005

(30) Foreign Application Priority Data
Oct. 16, 2003   (KR) ................. 10-2003-0072187

(51) Int. Cl.
*G01C 21/30* (2006.01)
*G01C 21/36* (2006.01)

(52) U.S. Cl. ................. 701/209; 701/211; 701/25; 701/201

(58) Field of Classification Search ........ 701/200–202, 701/208–211, 25–26; 340/995.1, 992, 995.11, 340/995.18, 995.19, 988, 995.15; 342/357.13
See application file for complete search history.

(56) References Cited

U.S. PATENT DOCUMENTS 5,659,476 A * 8/1997 LeFebvre et al. ........... 701/201
5,987,375 A * 11/1999 Tamai ........................ 701/200
6,505,118 B2 * 1/2003 Chowanic et al. .......... 701/209
6,591,188 B1 * 7/2003 Ohler ......................... 701/209
7,035,732 B2 * 4/2006 Hessling et al. ............ 701/209

FOREIGN PATENT DOCUMENTS

EP    0967460 A1 * 12/1999

* cited by examiner

*Primary Examiner*—Y. Beaulieu
(74) *Attorney, Agent, or Firm*—Greenblum & Bernstein, P.L.C.

(57) ABSTRACT

A method of making a driving path log file library for searching a car navigation path includes operating a car navigation system and deciding whether or not to store a driving path of a driver. When the driver decides to store the driving path, making a driving path log file with the driving path of the driver, storing the driving path log file, and making a driving path log file library out of the stored driving path log files. The driving path log file includes the driving path that the driver has driven through and then selected, and the driving path log file library includes a plurality of the stored driving path log files.

6 Claims, 4 Drawing Sheets

[FIG. 1a]     PRIOR ART
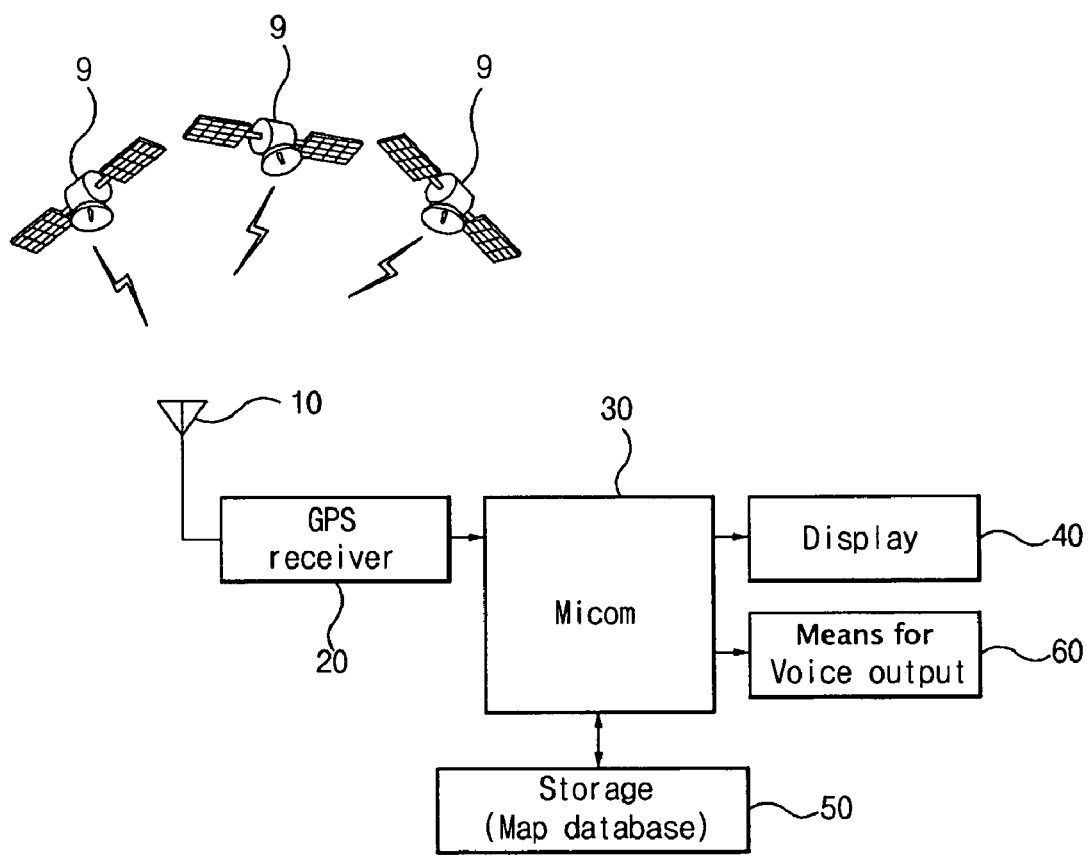

[FIG. 1b]    PRIOR ART
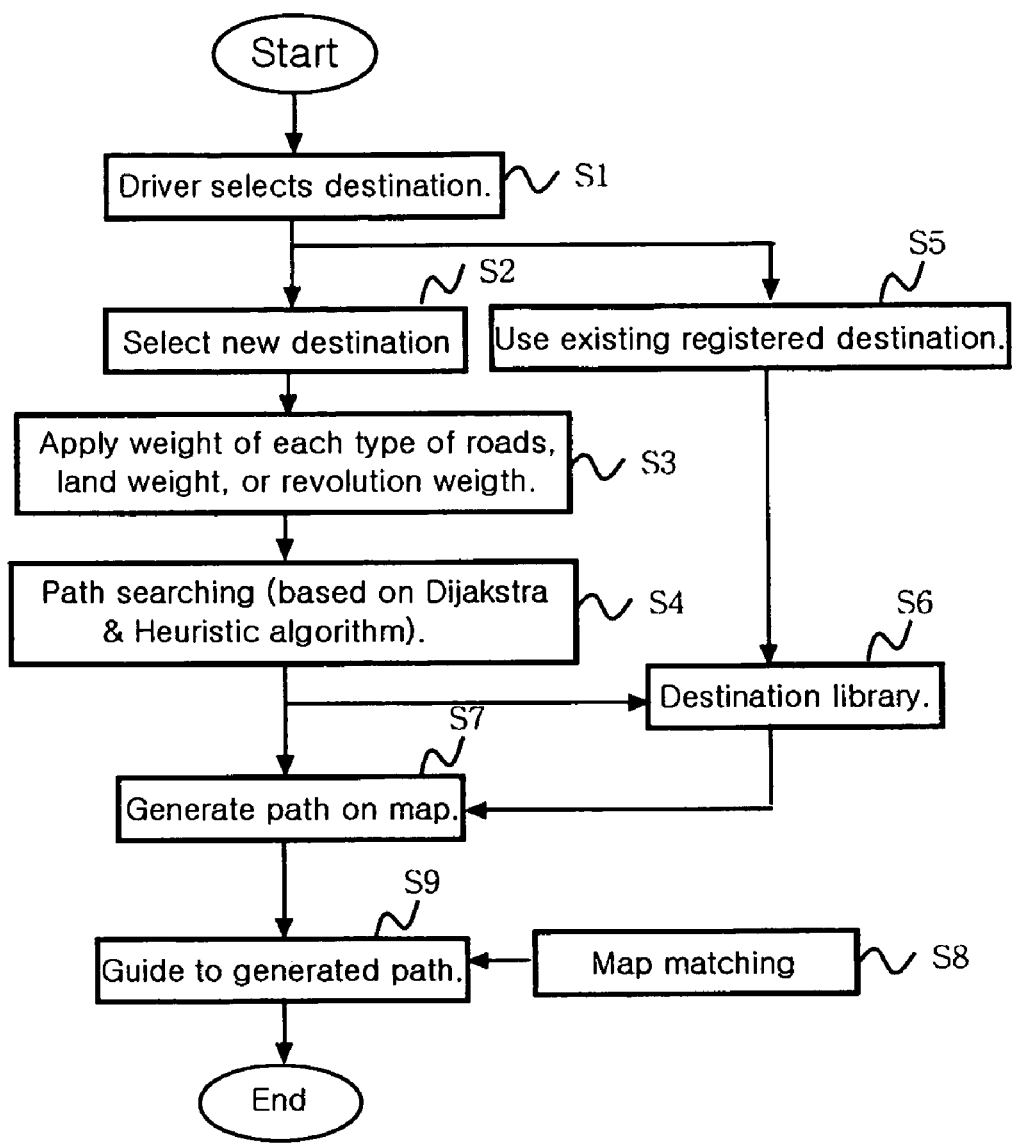

[FIG. 2]
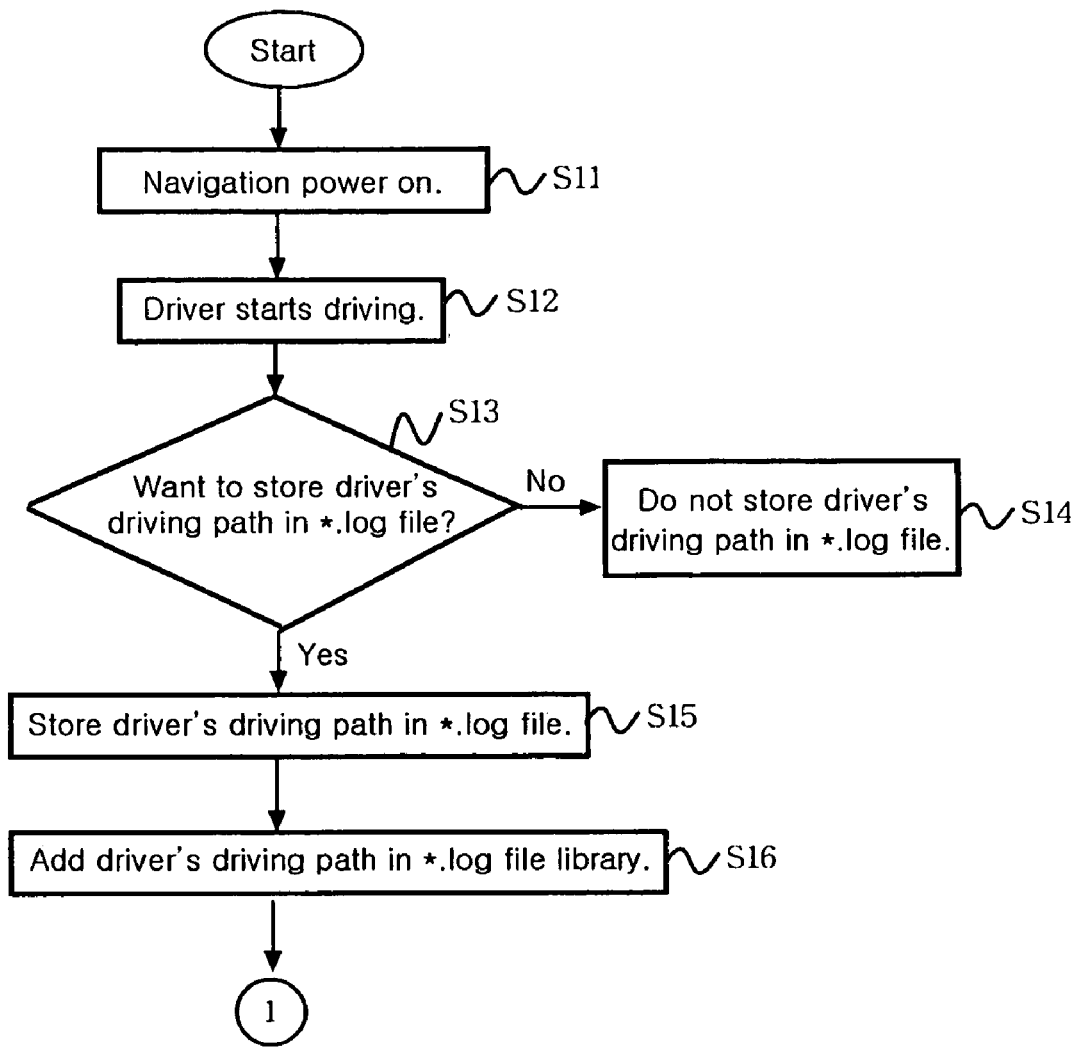

[FIG. 3]
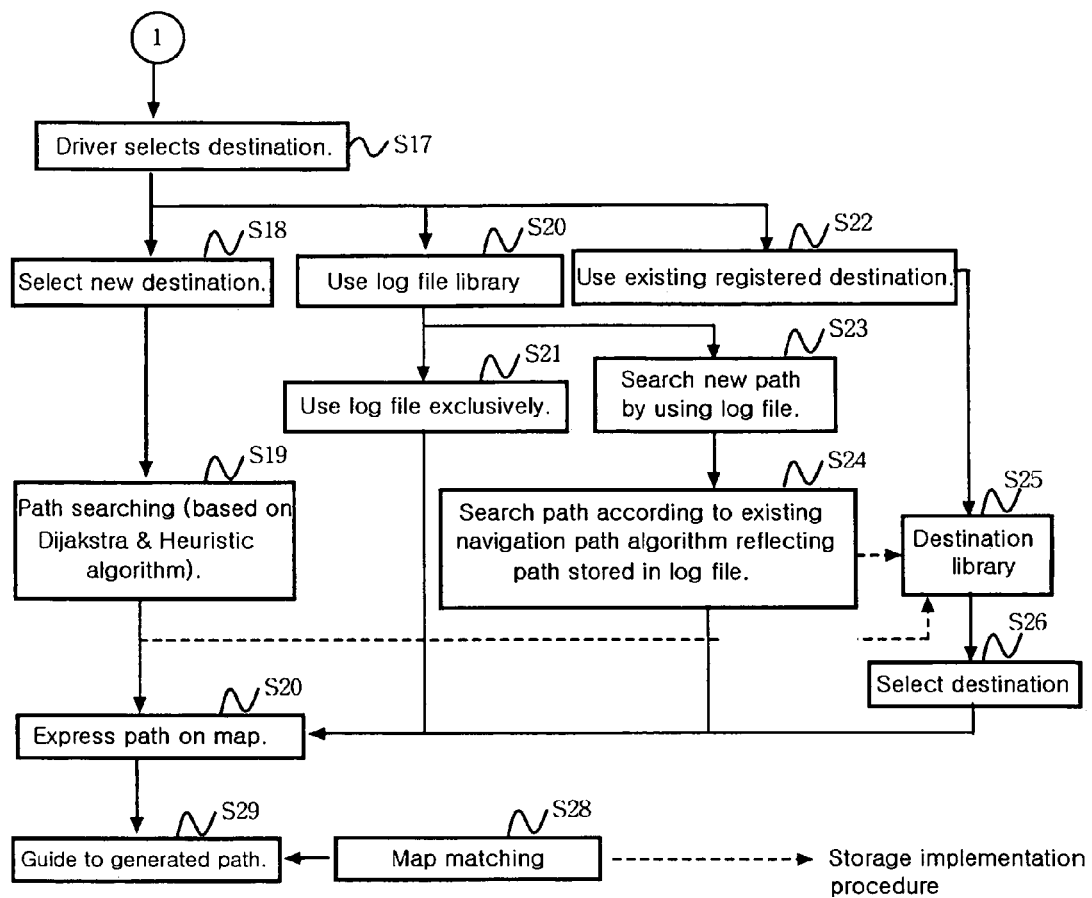

METHOD FOR SEARCHING CAR NAVIGATION PATH BY USING LOG FILE

RELATED APPLICATIONS

The present disclosure relates to subject matter contained in priority Korean Application No. 10-2003-0072187, filed on Oct. 16, 2003, which is herein expressly incorporated by reference in its entirety.

BACKGROUND OF THE INVENTION

1. Field of the Invention

The present invention is related to a method for searching a car navigation path by using a log file, more particularly, to a method for searching a navigation path using a log file in a car navigation system, allowing a driver to choose an optimal path out of a path searched by an existing navigation algorithm and a shortest path from the log file the driver himself found out from experiences.

2. Description of the Related Art

In general, a car navigation system using GPS (Global Positioning System) refers to a system for detecting an accurate position of a car, based on data provided by a GPS satellite. Usually more than three GPS satellites are used to provide drivers with real time information about present position and velocity of their cars.

Referring to FIG. 1a, a related art car navigation system using GPS includes a GPS receiver 20 for receiving the position information and velocity data of a car through a GPS receiving antenna 10 from three to four GPS satellites 9; a storage 50 for providing a CD-ROM player with map information obtained from a map database of GIS (Geographic Information System) that stores map data and management data in hierarchical format; micro computer or Micom 30 for searching a map the driver wants to see after calculating a present position of the car in the map coordinate system that is provided by the map database by reading map information provided from the storage 50 and a car position information signal outputted from the GPS receiver 20, and for controlling information about reduction and magnification of the map, and voice output; a display 40 for displaying on a LCD display panel the map, the position information, and additional information provided from the Micom 30; and means for a voice output 60 for receiving an audio signal concerning a search result from the Micom 30 and for outputting a voice for an advance driving path.

Accordingly, when the driver drives his or her car, the car navigation system, more particularly, the Micom 30 therein, provides the driver with car navigation information including the present position and an advance direction of the car, velocity of the car, and road information that are provided by the GPS receiver 20, the car velocity sensor and the storage 50 like a CD-ROM player.

Typically used algorithm for searching the car navigation path is Dijkstra algorithm to find a shortest path from a starting point (a source) to a destination at the earliest possible time. In other words, Dijkstra algorithm is a shortest path algorithm, finding a shortest path among all nodes that are connected to a present source node for a minimum cost.

The shortest path algorithm finds a shortest path for the navigation path searching, by minimum cost precedence. Using a distance from the source, a cost from the source to a final destination is calculated in order to find a node having a minimum cost. The node having a minimum cost becomes a shortest path from the source.

In the shortest path algorithm, variables for calculating the cost are link distance, type of roads (highways, national roads, free ways, local roads), or with or without road.

FIG. 1b is a flow chart showing a guiding procedure for searching a car navigation path according to a related art. As shown in FIG. 1b, a driver selects a destination he wants to go in the car navigation system (S1-S2). Then using weight for each type of roads (e.g., highways, national road, local road or street road in a city), free/toll way, traffic direction, lane weight, or revolution weight (S3), a navigation path is searched out according to Dijakstra or Heuristic shortest path algorithm (S4), and displayed a path to the destination on a navigation map (S7). After map matching following the navigation path (S8), the car navigation system provides path guidance to the driver (S9). When an already registered destination is used in the car navigation system (S5), wherein from a few to tens of destinations that the driver had been are stored in a library for destination (S6), a navigation path to the destination is displayed on the navigation map (S7) to provide a car navigation path to the driver by selecting among stored destinations in case of going to the same destination later (S9).

However, because of manufacture problems of the navigation map, traffic congestion in reality, or difficulties in optimization of the path search algorithm, the car navigation system often fails to search a shortest path to the driver in reality.

As a matter of fact, in many cases, the driver himself reaches the destination via a shorter path than the navigation path search algorithm. Even though communication navigation for providing real time traffic information has been developed, its accuracy is less than 30% and cannot display an actual shortcut on the map of the car navigation system.

SUMMARY OF THE INVENTION

It is, therefore, an object of the present invention to provide a method for searching a navigation path using a log file in a car navigation system, allowing a driver to choose an optimal path out of a path searched by an existing navigation algorithm and a shortest path from the log file stored in the log file library the driver himself found out from experiences.

To achieve the above object, there is provided a method for searching a car navigation path by using a log file, comprising the steps of: operating a car navigation system and deciding whether or not to store a driving path of a driver; when the driver decides to store the driving path, making a log file with the driving path of the driver; storing the driving path log file; and making a driving path log file library out of the stored driving path log file.

Another object of the present invention provides a method for searching a car navigation path by using a log file, comprising the steps of: when a driver selects a new destination, searching a path through a shortest path algorithm, displaying the path to the new destination on a map, map matching the path by following a navigation path, and providing the driver the resulting navigation path guide; when the driver selects an existing registered destination by using an existing registered destination library, reading an already-stored registered destination, displaying a path to the registered destination on a map, map matching the path by following the navigation path, and providing the driver the resulting navigation path guide; and when the driver selects a destination by using a driving path log file library, reading an already-stored driving path log file, displaying the stored driving path on a map, map matching the path by following the navigation path, and providing the driver the resulting navigation path guide.

BRIEF DESCRIPTION OF THE DRAWINGS

The above objects, features and advantages of the present invention will become more apparent from the following detailed description when taken in conjunction with the accompanying drawings, in which:

FIG. 1a is a schematic diagram of a related art car navigation system using GPS;

FIG. 1b is a flow chart showing a guiding procedure for searching a car navigation path according to a related art;

FIG. 2 is a flow chart showing a method for storing a driver's own driving path in a log file according to the present invention; and FIG. 3 is a flow chart showing a method for searching and guiding a car navigation path by using a log file according to the present invention.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

FIG. 2 is a flow chart showing a method for storing a driving course of a driver in a log file according to the present invention.

As shown in FIG. 2, when a driver powers on a car navigation system using GPS (Global Positioning System) (S11) and starts driving his or her car (S12), the navigation system, while being in the navigation system's operation, checks if the driver's driving path for predetermined interval not the path found by the navigation algorithm, is stored in a driving log file (*.log) (S13), and then stores the driving path log file (S15) in a driving path log file library (S16). When the driver does not want to store the log file in step 13, the driving path log file is not stored (S14).

When storing the driving path log file, an actual driving time zone thereof can be stored in the driving path log file. Therefore, a navigation path search in the log file can be searched in accordance with the driving time zone.

Particularly, the driving path log file means a relatively short path for driving a certain interval on the roads, which is obtained from the driver's experiences.

Given that the car navigation system is in operation, when the driver drives to a shortest path he personally found, not the path that is searched out according to the navigation algorithm, the shortest path (hereinafter, it is referred to as 'A') is stored in the driving path log file.

Afterwards, when the driver uses the path (A) or when the path (A) is included as a new path during the search of new paths, the driving path log file can be effectively used for searching a path.

Accordingly, the car navigation system of the present invention searches an optimum (or shortest) path based not only on the existing navigation algorithm but also on the driving path obtained from the driver's personal experiences within a certain interval on an actual road.

FIG. 3 is a flow chart showing a method for searching and guiding a car navigation path by using a log file according to the present invention.

As shown in FIG. 3, when a driver of a car having the car navigation system selects his or her intended destination (S17) as a new destination (S18), the car navigation system searches a navigation path through the Dijakstra or Heuristic shortest path algorithm by applying weight for each type of roads (e.g., highways, national road, local road or street road in a city), free/toll way, traffic direction, lane weight (S19), and displays a resulting generated path to the destination on a map of the car navigation system (S27). After map matching by following the navigation path (S28), the car navigation system guides the driver to the resulting navigation path (S29).

In the meantime, when an already registered destination library is used for searching a car navigation path (S22), the navigation system stores from a few to tens of previous destinations in the destination library (S25). In case that the driver wants to go to the same destination later, the navigation system selects a path to the destination out of the library and displays the path on the navigation map (S27). After map matching according to the navigation path (S28), the navigation system guides the driver to the navigation path (S29).

Further, after the driver selects a destination (S17) and decides to use the driving path log file library exclusively (S20, S21), the navigation system does map matching by the car navigation path that is the driver's own shortest driving path in a certain interval on the road, which has been stored in the driving path log file (S28), and guides the driver to the car navigation path (S29).

In addition, after the driver selects a destination (S17) and intends to search a new path interval by using the existing driving path log file library (S20), if there is already a path stored in the driving path log file for a new path the driver wants to find in a certain interval, the navigation system searches the new path by using the driving path log file (S23). Then, the navigation system searches a path according to the existing navigation path algorithm that reflects the path stored in the driving path log file (S24). After map matching the path by following the log file's navigation path on the system's map (S28), the navigation system guides the driver to the resulting car navigation path (S29).

The driving path log file includes a driving time zone when the driver actually drove at the time of making the log file. When the driver selects a destination by using the driving path log file library, the navigation system reads the already-stored driving path log file that is made at a nearest time that the driver selected the destination by using the driving path log file library, and guides the driver to the navigation path.

In conclusion, the method for searching the car navigation path by using the log file according to the present invention allows a driver to choose the optimal path out of the path searched by the existing navigation algorithm and the shortest path stored in the log file, which the driver himself discovered from experiences. Hence, the driver can be guided to an optimal path wherever he or she travels without a prior road study.

Moreover, by storing the actual driving time zones in the driving path log file, the navigation system can search the car navigation path on the log file in accordance with the driving time zones.

In addition, the car navigation system of the present invention can be advantageously used for the development of an intelligent destination search algorithm, the shortest path log file through the navigation algorithm can be used for the driver before the navigation is prepared. Also, as a Hard Disk Driver (HDD) navigation system is developed and upgraded to all kinds of memory medium, the log file can be transferred to another car navigation system, in order to share the shortest path information stored in the log file with other drivers.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A method of making a driving path log file library for searching a car navigation path, comprising:
   operating a car navigation system and deciding whether or not to store a driving path of a driver;
   when the driver decides to store the driving path, making a driving path log file with the driving path of the driver;
   storing the driving path log file; and
   making a driving path log file library out of the stored driving path log file,
   wherein the driving path log file comprises the driving path that the driver has driven through and then selectively stored, and the driving path log file library comprises a plurality of the stored driving path log files.

2. The method according to claim 1, wherein the driving path log file reflects a relatively short path obtained from the driver's actual driving experiences.

3. The method according to claim 1, wherein the driving path log file is stored with an actual driving time zone in the driving path log file.

4. A method for searching a car navigation path by using a log file, the method comprising:
   when a driver selects a new destination, searching a path through a shortest path algorithm, displaying the path to the new destination on a map, map-matching the path by following a navigation path, and providing the driver with a resulting navigation path guide;
   when the driver selects an existing registered destination by using an existing registered destination library, reading an already-stored registered destination, displaying a path to the registered destination on a map, map-matching the path by following the navigation path, and providing the driver with a resulting navigation path guide; and
   when the driver selects a destination by using a driving path log file library, reading an already-stored driving path log file, displaying the stored driving path on a map, map-matching the path by following the navigation path, and providing the driver with a resulting navigation path guide,
   wherein the driving path log file comprises the driving path that the driver has driven through and then selectively stored, and the driving path log file library comprises a plurality of the stored driving path log files.

5. The method according to claim 4, wherein the driving path log file is used to search a navigation path when the driver searches a path by using the shortest path algorithm.

6. The method according to claim 4, wherein the already-stored driving path log file includes a driving time zone at a time of making the log file, and when the driver selects a destination by using the driving path log file library, the navigation system reads out the already-stored driving path log file that is made at a nearest time zone that the driver selected the destination by using the driving path log file library, and guides the driver to the navigation path.

* * * * *